No. 12,467. REISSUED MAR. 27, 1906.

O. PRICE.

BUILDING CONSTRUCTION.

APPLICATION FILED JUNE 9, 1905.

2 SHEETS—SHEET 1.

Witnesses:
Benj. Rosenbaum.
R. W. Pillman

Inventor:
Orvey Price:
By his attorney,
F. H. Richards

No. 12,467. REISSUED MAR. 27, 1906.

O. PRICE.

BUILDING CONSTRUCTION.

APPLICATION FILED JUNE 9, 1905.

2 SHEETS—SHEET 2.

Fig. 3ª

Witnesses:

C. C. Fuss.

W. Pettmann

Inventor:

Orvey Price;

By his attorney,

F. H. Richards

UNITED STATES PATENT OFFICE.

ORVEY PRICE, OF PLAINFIELD, NEW JERSEY.

BUILDING CONSTRUCTION.

No. 12,467. Specification of Reissued Letters Patent. Reissued Mar. 27, 1906.

Original No. 788,944, dated May 2, 1905. Application for reissue filed June 9, 1905. Serial No. 264,524.

*To all whom it may concern:*

Be it known that I, ORVEY PRICE, a citizen of the United States, and a resident of Plainfield, in the county of Union and State of New Jersey, have invented a new and Improved Building-Slab, of which the following is a full, clear, and exact description.

The invention relates to an improved building-block formed of a composite of concrete or equivalent plastic material and a strengthening metallic frame and to a peculiar manner of assembling these blocks into a building to produce an imitation stone and other advantageous effects.

The invention more particularly relates to the provision of an improved slab or block for use as weather-boarding or siding of frame buildings.

The invention resides in certain novel features of structure and arrangement, which will be fully set forth hereinafter and pointed out in the claims.

Reference is had to the accompanying drawings, showing as an example practical embodiments of my invention, in which drawings similar characters of reference indicate like parts, and in which—

Figure 1:
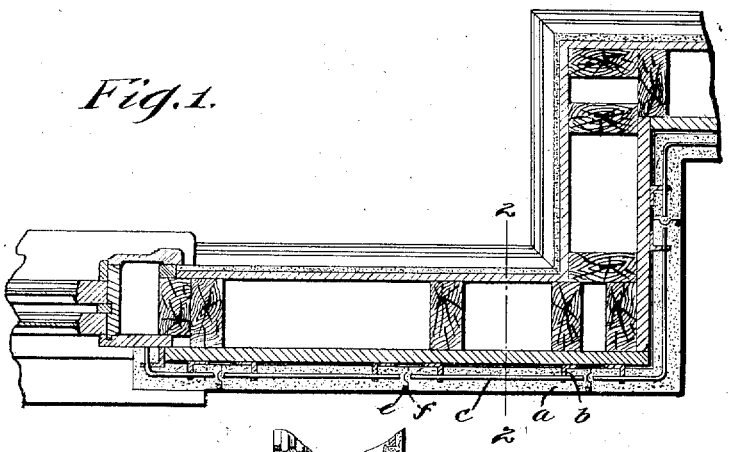
Figure 2:
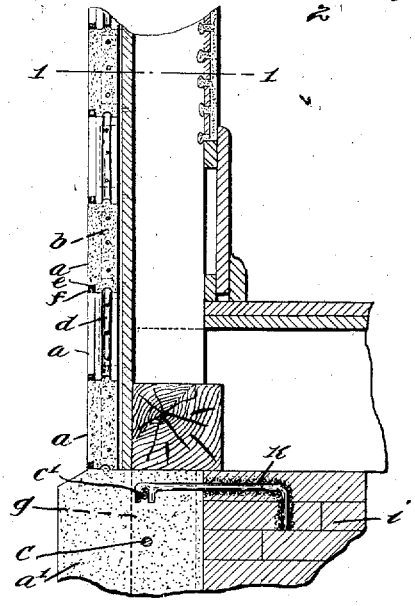
Figure 3:
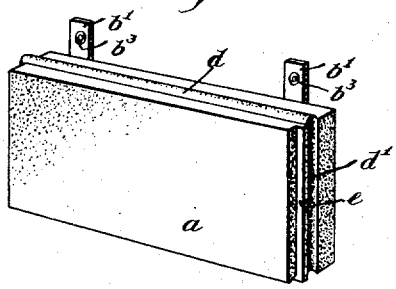
Figure 3:
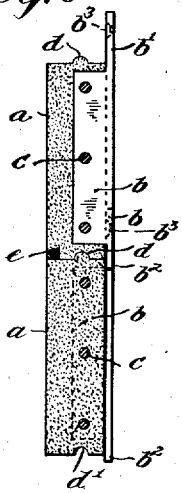
Figure 4:
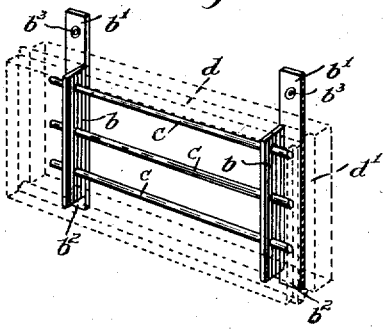
Figure 5:
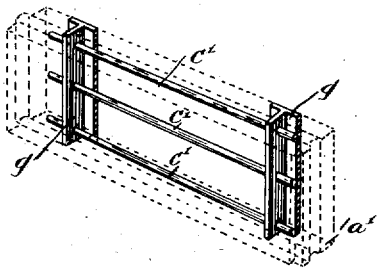
Figure 6:
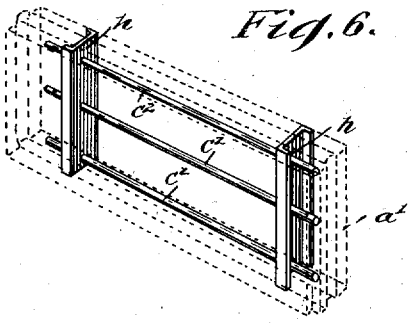

Figure 1 is a horizontal section on the line 1 1 of Fig. 2, showing the manner of applying the improvement to a frame building to imitate exteriorly a stone construction. Fig. 2 is a vertical section of the same on the line 2 2 of Fig. 1. Fig. 3 is a detail perspective view of one of the building-blocks. Fig. $3^a$ is an enlarged sectional view showing the manner of mounting the blocks on the building. Fig. 4 is a perspective view of the metallic frame employed with the block shown in Fig. 3, the outline of the concrete block being indicated by dotted lines; and Figs. 5 and 6 are perspective views of slight modifications in the metallic frame, these views also showing by dotted lines the outline of the concrete block.

These improved composite blocks may be employed for various purposes, but are specially designed and adapted for the exterior finish of buildings in place of siding or clapboards, forming what may be properly designated as a "stone" weather-board. Preferably concrete is employed for molding the blocks; but other equivalent plastic substances may be used in its stead.

As shown in Figs. 3, $3^a$, and 4, the concrete or other plastic block $a$ is molded around two angle-irons $b$, or rather around parts thereof, which are shown in said figures partly embedded in the concrete and have projecting ends $b'$ and $b^2$ extending, respectively, above and below the blocks. Said angle-irons $b$ are connected by rods $c$, which may be of any desired number and which also are embedded in the concrete. The blocks are formed with matching ribs $d$ and cavities $d'$, causing the blocks one to overlap or interlock with the other, and therefore fit tightly together, and the blocks are also formed with undercut rabbets $e$, extending around certain of their edges, so as to form pockets in which a suitable pointing material (indicated at $f$) may be placed, thus forming a hermetically-tight connection between the blocks. (See Figs. 1 and 2.)

Figs. 1, 2, and $3^a$ clearly illustrate the manner in which these improved building-blocks are mounted on the building. Referring particularly to Figs. 2 and $3^a$, the lowermost block $a$ is placed against the projecting ends $b^2$ of the angle-iron $b$ of the block next above, the projecting ends $b'$ of the angle-irons of said lowermost block having been first fastened into the sheathing or other part of the building by means of screws or equivalent devices extending through openings $b^3$ in said ends. (See Figs. $3^a$ and 4.) The block $a$ next above is then fastened in position by means of screws extended through said openings $b^3$ of the projecting ends $b'$ of the angle-irons of said second block $a$, and so on throughout the structure of the building. The blocks of one course are arranged to break joints with the blocks of the next course, so that the projecting ends $b'$ of the bottom course come out of registry with the projecting ends $b^2$ of the upper course and so also as to give the building the appearance of conventional masonry.

I desire it distinctly understood that the strengthening-bars $b$ may be of any desired cross-sectional form. For example, Fig. 5 shows equivalent bars (designated $g$) of T-iron, and Fig. 6 shows equivalent bars (designated $h$) of channel-iron. These bars are connected by rods $c'$ and $c^2$, respectively, the same as before described; but in the forms shown in Figs. 5 and 6 the bars $g$ and $h$ are not projected beyond the concrete block, but are entirely embedded therein and serve not only to strengthen and prevent cracking of the blocks, but also serve to increase the strengthening of the blocks under pressure. These modified forms are particularly fitted for use as part of the foundations of buildings, as indicated in the lower part of Fig. 2, where $a'$ may be taken to indicate a concrete block similar to that shown by broken lines at $a'$ in Fig. 5. Said blocks $a'$ are preferably much thicker, and consequently stronger, than the blocks $a$ and are anchored in the brickwork $i$ of the foundation by means of anchor-rods or other devices $k$, which may be of any desired form and which are set into the brickwork and into the concrete block and engaged with one of the rods $c'$ thereof.

Various changes in the form, proportions, and minor details of my invention may be resorted to at will without departing from the spirit and scope thereof. Hence I consider myself entitled to all such variations as may lie within the terms of my claims.

It is to be observed that the present construction of building-block, more properly termed a "slab," since it is preferably of a design, shape, and size particularly adapting it for the exterior finish of frame buildings, as a stone weather-board or block in place of siding or clapboards, has its strengthening-frame extending throughout the major part thereof, so that although the slab may become cracked it will not fall apart. It is also to be observed that in the form shown in Figs. 5 and 6 the bars $g$ and $h$, which are spaced apart, are embedded within the block, while in the form shown in Figs. 1 to 4 these bars $b$ are not completely embedded; but since the larger portion—in fact, the major portion—of the strengthening-frame is embedded the term "embedded" in the claims is to be construed as covering either form. It is also to be observed that the bars $b$, which, as stated, are spaced apart and connected by the rods, while to all intents and purposes are embedded in the slab, have flat portions thereof exteriorly located and lapping the rear face of the slab, with parts extending beyond the edges of the slab for the reception of fastening devices. Thus not only is the strengthening-frame embedded within the slab to stiffen it, but the slab in turn is backed up by those transverse bars which lap it exteriorly at its rear side, and as these transverse bars lie against the sheathing an air-space to the extent of the thickness of the bars is formed between such sheathing and the blocks, which is an advantageous feature. It will also be observed that the bars and rods form a unitary structure, since they are connected together, the rods in the present instance passing through the bars, so that the separation of one member of the stiffening-frame from another is not possible.

Having thus described my invention, I claim as now and desire to secure by Letters Patent—

1. A building-block, formed of a mass of hardened plastic material and a metallic strengthening-frame embedded therein, said frame comprising bars of angular cross-sectional form partly embedded and partly exposed, and connecting-rods passed through and extending between the bars, and said bars having portions extending beyond the edges of the block at the rear thereof, a part for the reception of fastening devices to hold the block in place and a part to lie in the rear of a companion block.

2. A building-block, formed of a mass of hardened plastic material, and a metallic strengthening-frame embedded therein, said frame comprising bars of angular cross-sectional form, each bar having a flat portion, one side face of which lies flush with one side face of the block, and connecting-rods extending through the angular bars from one to the other.

3. A building-block, formed of a mass of hardened plastic material, and a metallic strengthening-frame embedded therein, said frame comprising bars of angular cross-sectional form, each bar having a flat portion one side face of which lies flush with one side face of the block, and connecting-rods extending through the angular bars from one to the other, and the said flat portion being extended at one end beyond the adjacent edge of the block to facilitate fastening the block in place.

4. The combination with a supporting-surface, of a plurality of blocks formed of a mass of plastic material, a metallic frame embedded in each block, said frames comprising bars of angular cross-sectional form, each bar having a flat surface one face of which lies flush with one side face of the block, connecting-rods extending between the angular bars from one to the other, the said flat portions being extended at one end beyond the adjacent edge of the block to permit the adjacent block to overlap the extended portion, and means fastening each extended portion to the said supporting-surface.

5. A composition building-block provided with bars of angular cross-section extending across the block, one flange of said bars being wholly embedded therein and the other exposed, the wholly-embedded flanges being connected by strengthening-rods and the other flanges being extended beyond the edges of the block, a part thereof for the reception of fastening or retaining devices.

6. A composition building-block provided with bars bent or shaped in cross-section extending across the block, one part thereof being wholly embedded therein and another part running exteriorly substantially entirely across the rear of the block, the wholly-embedded parts being connected by strengthening means and the other parts being extended beyond an edge of the block for the reception of fastening or retaining devices.

7. A composition building-block having its edge constructed to interlock with a companion block and provided with bars bent or shaped in cross-section extending across the block, one part thereof being wholly embedded therein and another part exposed and extending exteriorly substantially entirely across the rear of the block, the wholly-embedded part being connected by strengthening means and the other parts being extended beyond the edges of the block, a part thereof for the reception of fastening or retaining devices and a part thereof to lie in the rear of a companion block.

8. A composition building-block provided with bars extending across the block, each having a plurality of flanges, one flange of each bar being wholly embedded in the block and the other exposed, the wholly-embedded flanges being connected by strengthening means and the other flanges being located at the rear and extended beyond an edge of the block to facilitate the fastening of the block in position.

9. A composition building-block having a metallic strengthening-frame embedded therein, comprising a pair of bars spaced apart and running across the block one part thereof being wholly embedded therein and another part exposed and extending substantially across the rear of the block, and one or more rods located in the plane of the block and connecting said bars, the latter having portions projecting beyond the edges of the block at the rear thereof, a part for the reception of fastening devices for fastening the block in place and a part to lie in rear of a companion block.

10. A composition building-block having a metallic strengthening-frame comprising bars of angular cross-sectional form, and means embedded in said block and connecting similar flanges of said bars, the other flanges of the bars having portions extending beyond an edge of the block for the reception of fastening devices for fastening the block in place.

11. A composition building-block having a metallic strengthening-frame comprising bars of angular cross-sectional form, means embedded in the block and connecting similar flanges of said bars, the other flanges of said bars having portions extending beyond both edges of the block, a part for the reception of fastening devices for fastening the block in place and a part to lie in the rear of a companion block.

12. A building-slab for weather-boarding or siding, formed of artificial stone or cement and having its edge provided with means for interlocking with or overlapping a companion slab, and provided with a strengthening-frame embedded therein and made up of members running in both directions, parts of some of the embedded members running in one direction exteriorly of the slab in the rear and substantially entirely across such slab and projecting beyond the edge of said slab for the reception of fastening devices.

13. A building-slab for weather-boarding or siding, formed of artificial stone and having its edge constructed to interlock with or overlap a companion slab, and provided with a metallic strengthening-frame embedded therein throughout the major portion of said slab and comprising a pair of bent or shaped bars spaced apart, with an intermediate bond, said embedded bars having parts located exteriorly of and lapping the slab at the rear substantially entirely across such slab, a part thereof projecting beyond the edges of the slab for the reception of fastening devices and a part thereof to lie in the rear of a companion slab.

14. A building-block formed of artificial stone or cement having a metallic strengthening-frame embedded therein, said frame comprising a pair of bars located relatively remote to each other and tied together, said bars having parts thereof extending entirely across the rear of the block and beyond the edges of said block, some for the reception of fastening devices and others to overlap the rear of a companion block.

ORVEY PRICE.

Witnesses:
C. A. WEED,
F. E. BOYCE.